United States Patent
Reiter et al.

(10) Patent No.: US 7,159,900 B2
(45) Date of Patent: Jan. 9, 2007

(54) PASSENGER SIDE AIRBAG MODULE

(75) Inventors: Thomas Reiter, Dachau (DE); Karl Heinz Sommer, Stockdorf (DE); Jörg Albert, Germering (DE)

(73) Assignee: Autoliv Development AB, Vargarda (SE)

( * ) Notice: Subject to any disclaimer, the term of this patent is extended or adjusted under 35 U.S.C. 154(b) by 297 days.

(21) Appl. No.: 10/826,012

(22) Filed: Apr. 16, 2004

(65) Prior Publication Data

US 2004/0245754 A1 Dec. 9, 2004

(30) Foreign Application Priority Data

Apr. 16, 2003 (DE) ................. 103 17 833

(51) Int. Cl.
*B60R 21/26* (2006.01)

(52) U.S. Cl. ...................... 280/740; 280/732

(58) Field of Classification Search ............... 280/740, 280/732, 730.2, 728.2
See application file for complete search history.

(56) References Cited

U.S. PATENT DOCUMENTS

| | | | |
|---|---|---|---|
| 5,234,229 A | | 8/1993 | Gordon |
| 5,362,096 A | * | 11/1994 | Satoh et al. ............. 280/728.3 |
| 5,547,215 A | * | 8/1996 | Taguchi et al. ............. 280/732 |
| 5,556,129 A | * | 9/1996 | Coman et al. ............. 280/730.2 |
| 5,676,395 A | | 10/1997 | Oe et al. |
| 5,927,748 A | * | 7/1999 | O'Driscoll .................. 280/729 |
| 6,082,765 A | | 7/2000 | Bowers et al. |
| 6,089,600 A | * | 7/2000 | Schenck et al. ............. 280/740 |
| 6,106,002 A | * | 8/2000 | Haesaert et al. ......... 280/728.2 |
| 6,158,765 A | * | 12/2000 | Sinnhuber ................ 280/728.3 |
| 6,213,502 B1 | | 4/2001 | Ryan et al. |
| 6,264,233 B1 | | 7/2001 | DeWitt |
| 6,352,284 B1 | * | 3/2002 | Okada et al. ............. 280/743.1 |
| 6,382,662 B1 | | 5/2002 | Igawa |
| 6,568,708 B1 | * | 5/2003 | Miodek et al. ............. 280/740 |
| 6,598,903 B1 | * | 7/2003 | Okada et al. ............. 280/743.2 |
| 6,702,318 B1 | * | 3/2004 | Rose et al. ............. 280/728.2 |
| 2002/0149177 A1 | | 10/2002 | Rose et al. |
| 2005/0110247 A1 | * | 5/2005 | Suzuki et al. ............. 280/728.3 |

FOREIGN PATENT DOCUMENTS

EP      1 205 362 A2    5/2002

* cited by examiner

*Primary Examiner*—David R. Dunn
*Assistant Examiner*—Drew J. Brown
(74) *Attorney, Agent, or Firm*—Brinks Hofer Gilson & Lione

(57) ABSTRACT

An airbag module in a motor vehicle having a modular casing installed behind at least one opening flap built into the instrument panel is characterized in that the disk-shaped gas generator, including the modular casing surrounding it, is arranged on-edge at an angle to the plane of the instrument panel, its narrow side being defined by the gas-discharge openings arranged on its perimeter, and the folded airbag is arranged at least partially between the narrow side of the gas generator and the opening flap.

7 Claims, 2 Drawing Sheets

PASSENGER SIDE AIRBAG MODULE

CROSS REFERENCE TO RELATED APPLICATION

This application claims priority to German patent application number 103 17 833.3, filed Apr. 16, 2003 which is currently pending.

BACKGROUND AND SUMMARY OF THE INVENTION

The invention relates to a passenger airbag in a motor vehicle comprising a module installed behind the instrument panel of the vehicle, a disk-shaped gas generator mounted within the module, a deflector that at least partially surrounds the gas-discharge openings located on the perimeter of the disk-shaped gas generator, and an airbag that is connected to the gas generator and/or the deflector and folded into the module. The module is installed behind at least one opening flap designed in the instrument panel.

An airbag with the abovementioned characteristics is described in US 2002/0149177 A1; in which a disk-shaped gas generator with gas-discharge openings arranged on its perimeter is arranged within a module casing in such a manner that the folded airbag engages the gas generator and its gas inlet openings and is thereby connected to the gas generator and is folded up on the surface of the disk-shaped gas generator.

A pot-shaped deflector surrounds the disk-shaped gas generator on the side opposite the folded airbag and its top open edge is directed into the connected airbag so that the deflector deflects the gas, which escapes radially from the gas-discharge openings of the gas generator, and guides it into the connected airbag. The disk-shaped gas generator is designed to be installed behind the instrument panel of a motor vehicle in such a manner that the plane of the disk is aligned parallel to the plane of the instrument panel and the opening flap thereon.

This mounting position of the disk-shaped gas generator has the disadvantage that, due to the large diameter of the disk-shaped generator inherent in its design, the module casing required therefor must be built accordingly large. In modern vehicles, there are constraints on available installation space because less and less installation space for airbag modules is available due, in particular, to the growing demand for ventilation channels built in behind the instrument panel. If airbag modules with tubular gas generators are built narrower, then other disadvantages are associated with the use of tubular gas generators, such as more expenses for sealing and connecting the airbag within the modular casing.

The objective of the invention is therefore to design a generic passenger airbag having a disk-shaped gas generator in such a manner that the dimensions of the module and consequently of the required installation space behind the instrument panel of the vehicle are reduced.

The solution of this objective, including advantageous embodiments and further developments of the invention, results from the contents of the claims that follow this description.

SUMMARY OF THE INVENTION

The basic idea of the invention is that the disk-shaped gas generator, including the module surrounding it, is arranged on-edge at an angle to the plane of the instrument panel, its narrow side being defined by gas-discharge openings arranged on its perimeter, and the folded airbag is arranged at least partially between the narrow side of the gas generator and the opening flap.

With the invention there is associated the advantage that the width of the airbag module and the installation space required therefor are basically restricted to the overall height of the disk-shaped generator. If the folded airbag comes to rest at least partially between the narrow side of the gas generator and the opening flap, at least part of the released gas will flow over the airbag due to the gas-discharge openings arranged on the perimeter of the disk-shaped gas generator, so that the opening characteristics of both the folded airbag and the opening flap that it pressurizes are improved.

According to one exemplary embodiment of the invention, it is provided that the deflector surround the disk-shaped gas generator in the peripheral area opposite the opening flap in order to guide the gas flow escaping from the gas-discharge openings arranged in this area into the airbag folded between the gas generator and opening flap. In addition to the deflection of the gas escaping from the gas-discharge openings that this effects, the use of a deflector arranged in this manner advantageously provides the possibility of installing additional particle filters in the installation space of the deflector; moreover, additional guide vanes may be provided for gas deflection. In inflating the airbag, the deflector can reduce the tensile forces that occur in the airbag.

In accordance with this invention, the deflector may moreover be applied to dividing the folded airbag into different airbag packages and thus provide the folded airbag with an orientation regarding the approach flow and unfolding. The deflector may also be fastened to the modular casing by additional fastening means, like plugs or screws; but it may also be provided that the deflector is fastened by gluing or welding or by a combination of the aforementioned fastening procedures. The deflector may surround the gas generator completely or partially. If the gas generator is only partially surrounded, then the module casing will take over the function of gas deflection.

In regard to the mounting position of the gas generator and module, one exemplary embodiment of the invention provides that the disk-shaped generator, whose plane is defined by the gas-discharge openings, be aligned normal to the surface of the opening flap. In regard to an angular arrangement of the gas generator to the module, one exemplary embodiment of the invention provides that the disk-shaped gas generator, whose plane is defined by the gas-discharge openings, make an angle of no more than 50° from normal to the surface of the opening flap, wherein the corresponding angle may be aligned normal to the surface of the opening flap on both sides.

If it is provided, according to one exemplary embodiment of the invention, that a subsection of the deflector cover the gas-discharge openings directed toward the opening flap, this will prevent the incompletely unfolded airbag package from accelerating in the direction of the vehicle occupant, possibly reducing the load acting on the occupant when the airbag unfolds.

The reduction of the required installation space provides the possibility of even accommodating two gas generators within the module casing for sequential unfolding of connected airbags or airbag areas, wherein these gas generators may be arranged side-by-side or one behind the other relative to the instrument panel.

The drawing describes an exemplary embodiment of the invention which is described below.

DETAILED DESCRIPTION OF THE INVENTION

Figure 1:
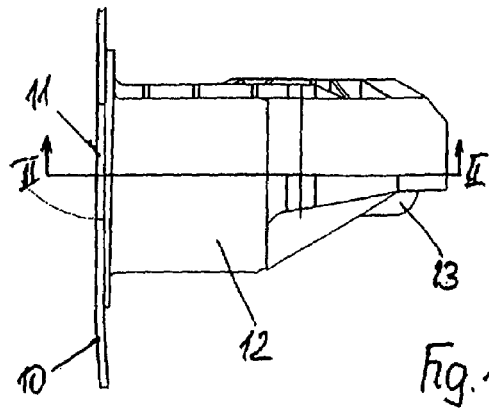
FIG. 1 is a top view of an instrument panel having an airbag module connected to the opening flap on the narrow side.

As is evident in FIG. 1 from the top view of the instrument panel 10, including the airbag module with an opening flap 11 provided in the instrument panel. A module casing 12 having a disk-shaped gas generator 13 is connected behind the opening flap 11 in such a manner that the narrow side of the disk-shaped generator 13 is arranged on-edge to the plane of the instrument panel 10, at a right angle in the generator 13 (and its central axis 19) is aligned generally parallel to the plane of the instrument panel 10. Gas generator 13 is of a type having its height or thickness (measured along axis 19) substantially less than its diameter.

Figure 2:
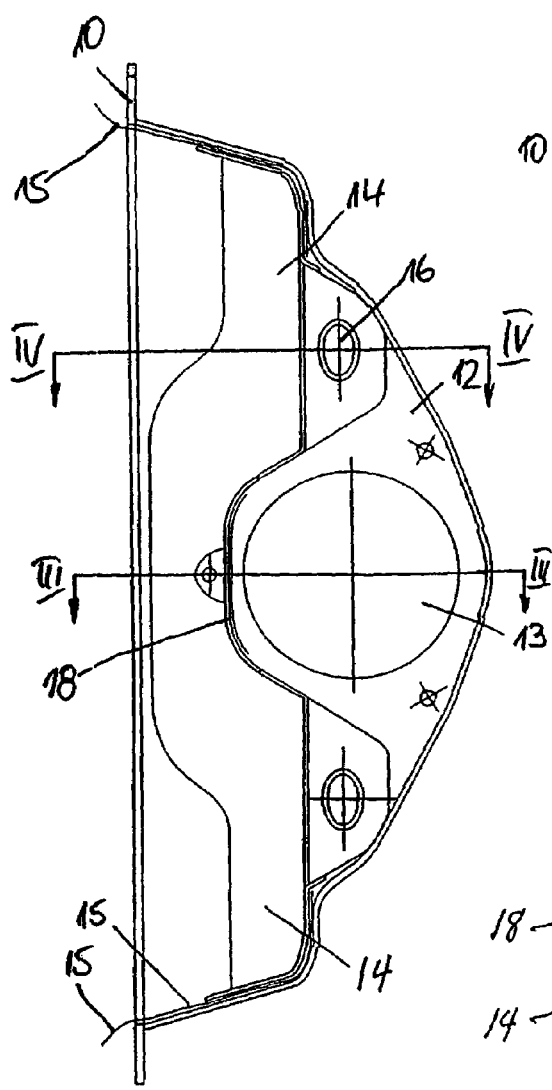
FIG. 2 illustrates a side view cut according to line 2—2 in FIG. 1.

As is evident in FIG. 2, a deflector 14, which in the illustrated exemplary embodiment is fastened by fastening plugs 16 feeding through the module casing 12, is arranged in the interior of the module casing 12 in addition to the gas generator 13. On its edges that are directed to the opening flap 11 of the instrument panel 10, the deflector 14 surrounds an airbag 15, which has already unfolded out of the module casing 12 in the exemplary embodiment depicted in FIG. 2. The airbag 15 is connected to the modular casing 12 and deflector 14 by fastening plugs 16 and partially surrounds the deflector 14. A subsection 18 of the deflector 14 partially covers a portion of the perimeter of the gas generator 13 in the central area in such a manner that the radially flowing gas cannot directly act upon the airbag 15 folded in this area but is diverted.

Figure 4:
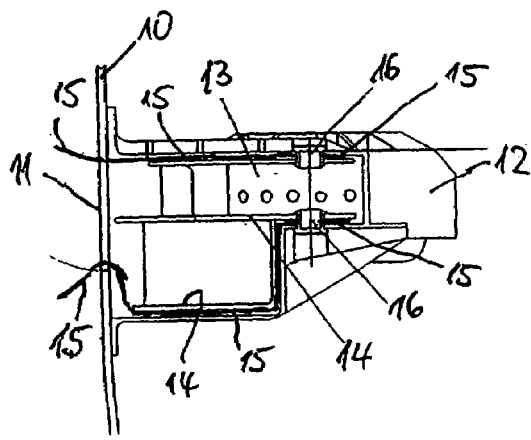
FIG. 4 illustrates a top view cut according to line 4—4 in FIG. 2.
Figure 3:
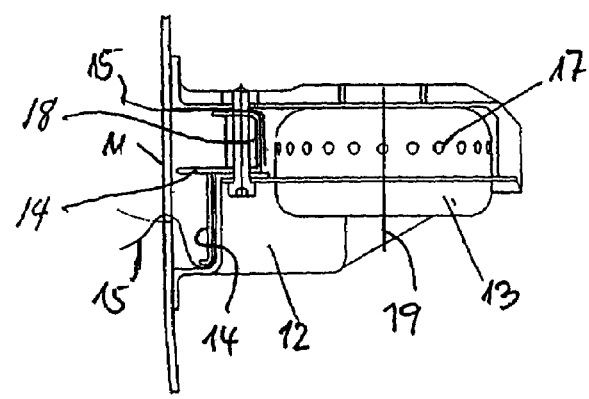
FIG. 3 illustrates a top view cut according to the line 3—3 in FIG. 2.
Figure 5:
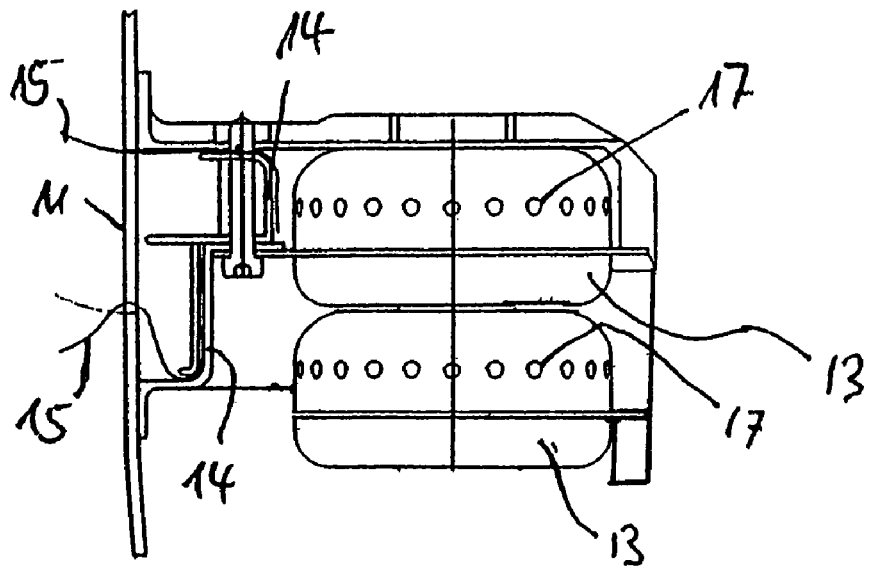
FIG. 5 illustrates the top view of FIG. 3 with two gas generators.
Figure 6:
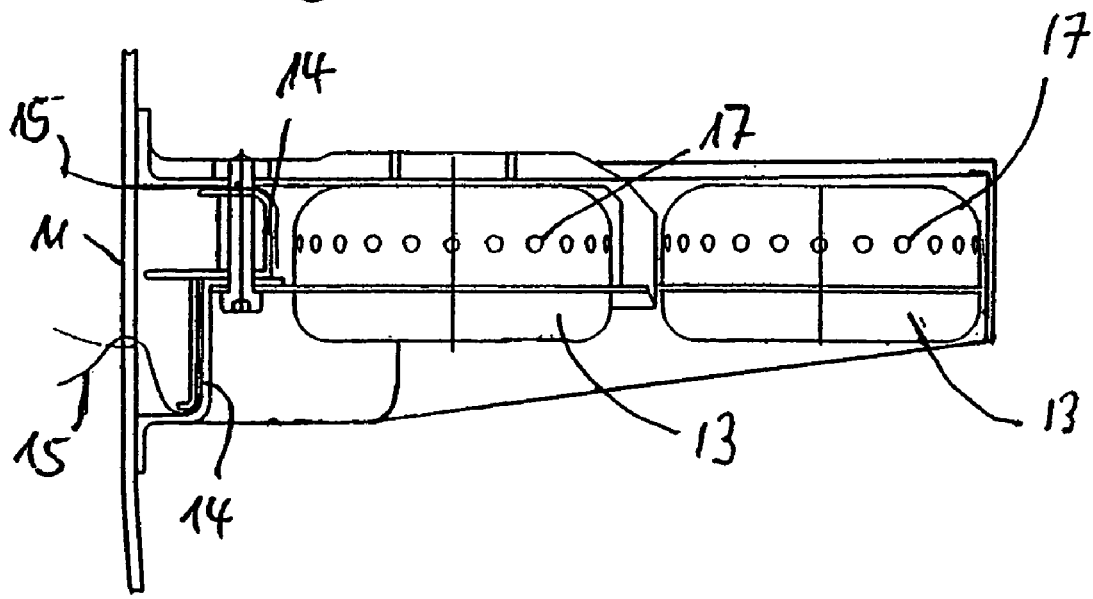
FIG. 6 illustrates the top view of FIG. 5 with an alternate arrangement of two gas generators.

As is evident in FIG. 3, the disk-shaped gas generator 13 includes gas-discharge openings 17 on its outer perimeter through which the gas is released when the gas generator is triggered. This representation is further explained by FIG. 4.

The characteristics of the object of these documents, which are disclosed in the present description, the claims, the abstract and the drawing, may be essential to the realization of the invention in its various embodiments either individually or in any combination.

While the above description constitutes the preferred embodiment of the present invention, it will be appreciated that the invention is susceptible to modification, variation and change without departing from the proper scope and fair meaning of the accompanying claims.

We claim:

1. An airbag module for a motor vehicle for mounting behind an instrument panel and deployment through an airbag cover in the instrument panel comprising:

a module casing, a disk-shaped gas generator mounted within the module casing having gas-discharge openings located on a perimeter of the gas generator, the gas-discharge openings defining a plane, a deflector that at least partially surrounds the gas-discharge openings, an airbag that is folded into the module casing, the plane of the disk-shaped gas generator being arranged on-edge substantially perpendicular to the airbag cover in the instrument panel, with the folded airbag arranged at least partially between the perimeter of the gas generator and the airbag cover.

2. An airbag module according to claim 1 wherein the deflector at least partially surrounds the perimeter of the disk-shaped gas generator in the area between the airbag cover and the gas generator in order to guide a gas flow escaping from the gas-discharge openings into the airbag.

3. An airbag module according to claim 1 wherein a subsection of the deflector covers the gas-discharge openings directed toward the airbag cover.

4. An airbag module according to claim 1 wherein two gas generators are arranged within the modular casing.

5. An airbag module according to claim 4 wherein both gas generators are arranged side-by-side relative to the instrument panel.

6. An airbag module according to claim 4 wherein both gas generators are arranged one behind the other relative to the instrument panel.

7. An airbag module according to claim 1 wherein the disk-shaped generator defines a central axis which is substantially parallel with the surface of the airbag cover.

\* \* \* \* \*